United States Patent
Li et al.

(10) Patent No.: US 8,130,389 B2
(45) Date of Patent: Mar. 6, 2012

(54) COST EFFECTIVE IMAGE PATH FOR MULTIPLE OFFICE APPLICATIONS

(75) Inventors: Xing Li, Webster, NY (US); Ramesh Nagarajan, Pittsford, NY (US); Clara Cuciurean-Zapan, Fairport, NY (US); Francis Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1110 days.

(21) Appl. No.: 11/961,012

(22) Filed: Dec. 20, 2007

(65) Prior Publication Data

US 2009/0161136 A1 Jun. 25, 2009

(51) Int. Cl.
*G06K 1/00* (2006.01)

(52) U.S. Cl. .......................... 358/1.13; 358/1.15; 358/1.9

(58) Field of Classification Search .................. 358/1.13, 358/1.15, 1.9; 347/115
See application file for complete search history.

(56) References Cited

U.S. PATENT DOCUMENTS

| | | | |
|---|---|---|---|
| 4,850,027 A | 7/1989 | Kimmel | |
| 5,420,967 A * | 5/1995 | Delp | 345/646 |
| 5,715,070 A | 2/1998 | Tone et al. | |
| 6,014,160 A | 1/2000 | Tewinkle et al. | |
| 6,343,159 B1 | 1/2002 | Cuciurean-Zapan et al. | |
| 6,366,362 B1 * | 4/2002 | Butterfield et al. | 358/1.9 |
| 6,728,419 B1 | 4/2004 | Young | |
| 2001/0035983 A1 * | 11/2001 | Abe | 358/468 |
| 2001/0048530 A1 * | 12/2001 | Hayashi et al. | 358/1.13 |
| 2001/0050775 A1 * | 12/2001 | Nitta | 358/1.1 |
| 2004/0263908 A1 * | 12/2004 | Jacobs et al. | 358/2.1 |
| 2005/0123212 A1 * | 6/2005 | Gallagher et al. | 382/254 |
| 2006/0077249 A1 * | 4/2006 | Oshikiri et al. | 347/115 |
| 2006/0215203 A1 * | 9/2006 | Taniuchi et al. | 358/1.13 |
| 2006/0257045 A1 | 11/2006 | McCandlish | |
| 2007/0103731 A1 | 5/2007 | Tse et al. | |
| 2007/0109602 A1 | 5/2007 | Tse et al. | |
| 2007/0253631 A1 | 11/2007 | McCandlish et al. | |
| 2007/0258101 A1 | 11/2007 | Nagarajan et al. | |

\* cited by examiner

*Primary Examiner* — King Poon
*Assistant Examiner* — Allen H Nguyen
(74) *Attorney, Agent, or Firm* — Pillsbury Winthrop Shaw Pittman LLP

(57) ABSTRACT

A method and apparatus for configuring an image path of an image processing apparatus is herein described. The image processing apparatus includes at least an input terminal or scanner for inputting or scanning document into image data and an output terminal or printer for printing documents. The method includes selecting one of a plurality of output modes using a selection device associated with the image processing apparatus. Based on the selected output mode, an image path among a plurality of image processing elements of the apparatus is selected among a plurality of image paths. Each image path corresponds to one of the plurality of output modes. After a document is scanned with the scanner into image data, the image data is processed with the processing elements in the selected image path, and output or printed based on the processed image data.

15 Claims, 7 Drawing Sheets

COST EFFECTIVE IMAGE PATH FOR MULTIPLE OFFICE APPLICATIONS

BACKGROUND

1. Field

The present disclosure is generally related to a system and methods for configuring an image path of an image processing apparatus. More specifically, the present disclosure is generally related to selecting an output mode for an image processing apparatus so as to provide high productivity and high quality output image data.

2. Background

Image data comprises a number of pixels. Each pixel corresponds to a defined location in the image. Image data includes various color or gray levels. Each pixel of an image is assigned a number representing the amount of light or gray level for that space or that particular spot, i.e., the shade of gray in the pixel. Binary image data has two possible values for each pixel, black or white, which are represented by a 1-bit value (1 for back, 0 for white). Image data may be defined in terms of a color space using values such as RGB (red, green, blue) or CMYK (cyan, magenta, yellow, black) or luminance and chrominance channels such as YCbCr or L*a*b. Images that have a large range of shades of grays are referred to as grayscale images. For example, an 8-bit value comprises 256 values or shades of gray for each pixel in the image. Grayscale image data may also be referred to as continuous tone images or contone images. In some instances, binary image data may be converted to images that appear to have continuous tone by processing the data using processes such as halftoning, for example.

When image data is provided by an image input device or terminal (IIT), such as a scanner, it may be received and/or processed to input binary or contone image data. When scanning, printing or copying image data, the image data often goes through a number of image processing operations such as, but not restricted to, scaling, color space conversion, filtering, rasterization (i.e., converting image data in vector graphics format or shapes into pixels for output on a printer), and/or a number of image manipulation operations, such as middle function operations (merging, annotating, etc.) for output. That is, to send an image to an image output terminal (IOT), such as for a multifunction product (MFP) (e.g., a solid ink or toner printing device), it may be desirable to manipulate the pixels of the image data for output. For example, an input image may be scanned as contone image data, processed using a number of image processing and image manipulation operations, and then printed using converted halftone image data.

Office products such as MFPs are generally designed to manipulate image data such that the output meets the demands of the user. The office market place is demanding a higher level of image quality from office products such as MFPs, for example. Some offices may prefer that the image quality of printed documents is at a high level of quality (e.g., such as the quality used in the graphic arts industry). The image quality of an output document may rely on the image data and manipulation of the data along an image path. The image path is the path for which image data is received and processed to convert the image data to the output format that is desired.

Some offices may also require a high productivity output. Generally, devices such as MFPs measure productivity by the machines ability to multitask and produce output in a timely manner. Productivity may be limited by the bandwidth required to perform middle function operations common to copying and printing.

Office products generally receive multiple requirements depending on the industry. For example, office products must meet the demands of average office users by providing reasonable image quality at high productivity levels, and, at the same time, meet the demands of graphic arts users by providing high image quality. Sometimes these markets coexist at one location or within one organization.

Traditionally, such markets (such as the office and graphic arts industries) may be serviced by two different devices. To meet such diverse demands of multiple applications, different image paths or controllers have been provided with such office product printing devices. Some office devices utilize a binary image path to process data. Generally, processing and providing binary image data may increase the productivity as the image data is processed using a smaller bandwidth. However, the image quality of output document may be limited.

Depending on the processes performed on the image data, the manipulation of the image data in an image path may provide unforeseen disadvantages. For example, some products have attempted to meet high quality output demands by providing an image path that uses and manipulates contone image data. However, the movement of the image data along an image path may be a costly process in terms of processing power and time required for processing, particularly when using contone image data (e.g., image data with 8 bits per pixel (bpp) for each of color component/separation/plane). Thus, although processing contone data in an image path may solve problems associated with quality (i.e., by generating an image or document of a high quality output), it is more expensive to implement in office products due to the devices and manipulation used in the image path, particularly when performing concurrent operations such as printing, copying, storing, and faxing, as well as middle functions such as rotating, merging, scaling, and so forth.

Other office products, such as described in U.S. Pat. No. 5,715,070, have included a plurality of processing sections that may be enabled and disabled selectively. However, enabling and disabling individual image processing sections and their functions does not address the issue of offering a high quality output at a reasonable cost. Some office printing devices, such as described in U.S. Pat. No. 4,850,027, may attempt to provide a configurable image path that determines the pipeline of image processing, whether to provide an image path (e.g., to process the image data) in series or in parallel during the printing operation based on job parameters or the complexity of a job. However, such a system or apparatus only generally addresses the image process pipeline or path, and does not allow changes in bandwidth nor does it provide the ability to produce different quality outputs at varying productivity.

SUMMARY

One aspect of the disclosure provides a method for configuring an image path of an image processing apparatus, the image processing apparatus including an image input terminal for inputting a document into image data and an image output terminal for outputting documents. The image input terminal may be a scanner for scanning a document, and the image output terminal may be a printer for printing documents, for example. The method includes selecting one of a plurality of output modes using a selection device associated with the image processing apparatus. Based on the selected output mode, the method includes selectively selecting an image path among a plurality of image processing elements between the image input terminal and the image output terminal using a controller. Each of the plurality of image processing elements includes an input and output and a plurality of image paths. Each of a plurality of image paths is a series of routing connections between the inputs and outputs of the processing elements, and each image path corresponds to one of the plurality of output modes. The method includes inputting a document with the image input terminal into image data, processing the image data of the document with the processing elements in the selected image path, and outputting a document based on the processed image data.

Another aspect of the disclosure provides a configurable image processing apparatus. The apparatus includes a scanner for scanning a document into image data; a printer for printing a document; a selection device for selecting one of a plurality of output modes of the image processing apparatus; a plurality of image processing elements for processing the image data, each of the processing elements comprising an input and an output. The apparatus also includes a router configured to route the image data among the processing elements via an image path selected from a plurality of image paths. Each image path is a series of routing connections between the inputs and outputs of the processing elements. The router is configured to select the image path based upon the selected output mode.

An aspect of the present disclosure includes a non-transitory computer readable medium having stored computer executable instructions. The computer executable instructions, when executed by a computer, direct a computer to perform a method for configuring an image path of an image processing apparatus configured to output image data using a specific type of output device. The method includes selecting one of a plurality of output modes for the specific type of output device using a selection device associated with the image processing apparatus. Based on the selected output mode, the method includes selectively selecting an image path among a plurality of image processing elements between an image input terminal and an image output terminal using a controller. Each of the plurality of image processing elements includes an input and output and a plurality of image paths. Each of a plurality of image paths is a series of routing connections between the inputs and outputs of the processing elements, and each image path among the plurality of processing elements corresponds to one of the plurality of output modes for the specific type of output device. The method includes inputting a document with the image input terminal into image data, processing the image data of the document with the processing elements in the selected image path, and outputting a document from the specific type of output device based on the processed image data.

Other features and advantages of the present disclosure will become apparent from the following detailed description, the accompanying drawings, and the appended claims.

DETAILED DESCRIPTION

The proposed disclosure describes an image path that may be selectively selected, using a single controller or router, to vary the performance of an image processing apparatus between at least a high productivity mode and a high quality graphics mode by providing a plurality of selectable output modes which correlate to a number of image paths in image processing elements. Generally, the method and apparatus as described herein allow for reconfiguration of each scan, print, fax, or copy job; that is, as will be further described, a user may configure the output mode to a high productivity output or high quality output between each job.

The productivity of an image processing apparatus such as a MFP may be measured by the apparatus's ability to multi-task a number of jobs, and may be driven primarily by the input and output bandwidth around the middle processing functions (e.g., those functions common to scanning, printing, faxing, and copying using the apparatus). The method and apparatus herein may adjust the amount of processing bandwidth in the image path that is processed and stored based on a selected output mode.

In an embodiment, the image quality of image paths on existing image processing apparatuses may also be improved by adding an additional back end processing element to the image path. These and other advantages will become evident as further described below.

Figure 1:
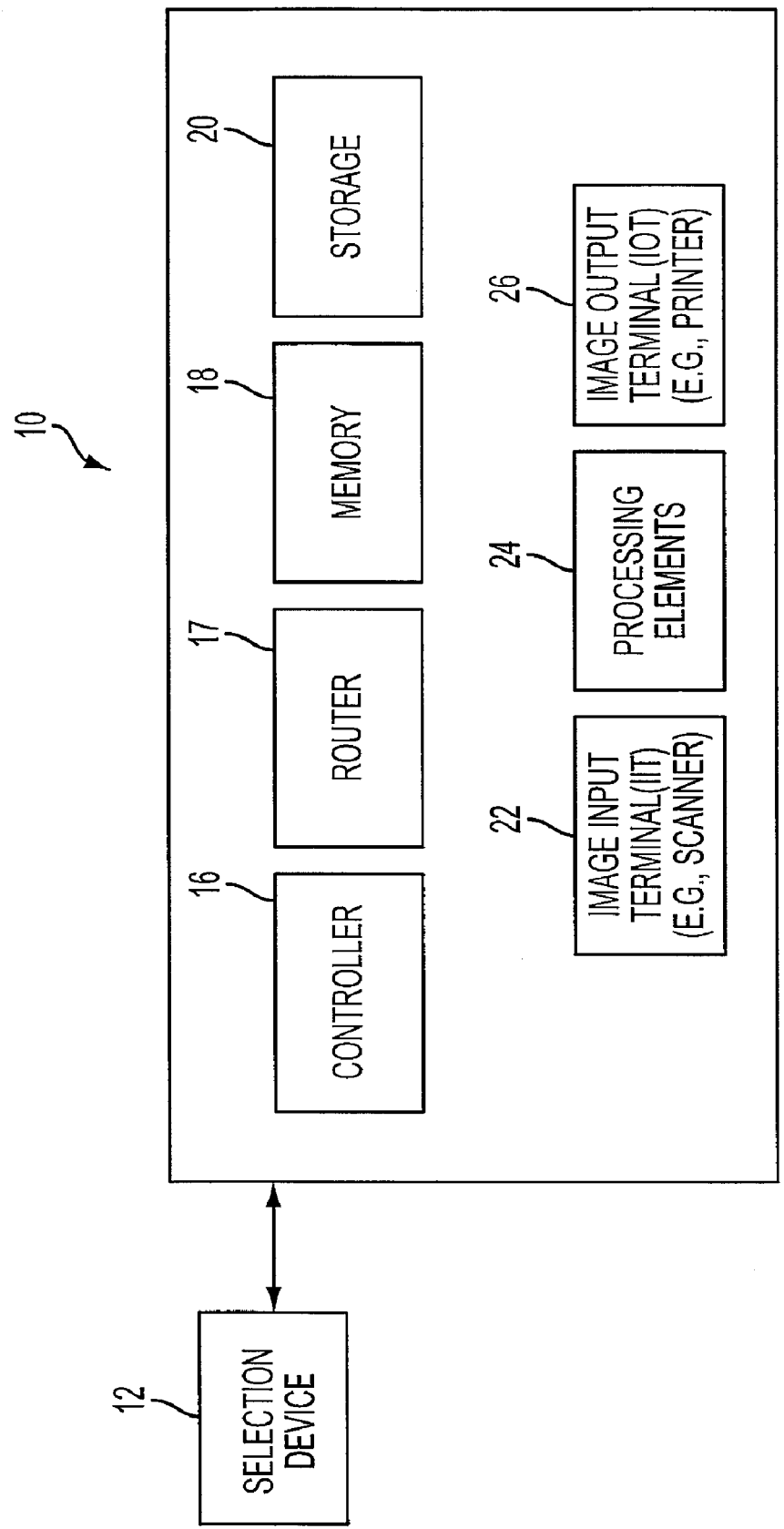
FIG. 1 illustrates an example of an image processing apparatus in accordance with an embodiment of the present disclosure.

FIG. 1 illustrates an example of an image processing apparatus 10 in accordance with an embodiment of the present disclosure. As will be further described, the image processing apparatus 10 allows for selection and configuration of an image path for output to an image output terminal (IOT) 26 or marking engine interface of an output device such as a multifunction product device (MFP) that includes at least the capability to print and/or scan documents.

The apparatus 10 comprises a controller 16, a selector or router 17, a memory 18 and/or a storage device 20, an image input terminal (IIT) 22, a processor or processing elements section 24, and an image output terminal (IOT) 26 or marking engine interface for an output device such as a printer. Generally, the above elements (as will be described) of the apparatus 10 are provided to perform functions that assist in receiving image data such as a scanned document, configuring the image path of the processing elements section 24 to process the image data, and outputting the image data such as printing a document according to an output mode that may be selected. However, it should be noted that the apparatus 10 may comprise additional elements not described herein or alternative elements for performing similar functions, and should not be limited to those elements as illustrated in FIG. 1.

The controller 16 is used to selectively choose an image path among a plurality of the processing elements 24 between the IIT 22 and the IOT 26, based on the selected output mode.

The controller 16 may provide instructions to the router 17, memory 18, storage 20, and/or processing sections 24, for example.

The router 17 may be used to route or direct the image data among the image processing elements based on the selected image path. The router 17 receives instructions regarding the chosen image path for the image data from the controller 16 and selectively routes the image data to the input and output for each processing element in the image processing elements section 24 that is associated with the selected image path. For example, the router 17 may determine, after receiving input from the controller, the order or sequence of the image processing elements for which the image data should be directed (e.g., for processing and/or manipulation under the chosen parameters). The router 17 may change the sequence of processing the image data (i.e., the image path) according to the input by the controller 16.

The memory 18 and/or storage 20 may be used to store image data. For example, the memory 18 and/or storage 20 may be used to temporarily store the original image data input via IIT 22. Converted (e.g., binary to contone image data, contone to binary image data) or compressed image data may also be stored in the memory 18 and/or storage 20. The memory 18 may be implemented using static or dynamic RAM, a floppy disk and disk drive, a writable optical disk and disk drive, a hard disk and disk drive, flash memory, or the like, and may be distributed among separate memory components. The memory 18 can also include read only memory.

The memory 18 and/or storage 20 may be used to store image data that may be later accessed and retrieved. The controller 16, memory 18, and/or storage 20 may be used in cooperation with or communicate with IIT 22 and/or scanning engine interface, one or more processing elements in processing elements section 24, and/or IOT 26 and/or marking engine interface.

The IIT (herein referred to as scanner but not limited thereto) 22 is used to scan or acquire a document into image data. The scanner 22 may capture image data as binary or contone image data, for example. The scanner 22 may be a digital scanner, for example. Generally, however, any device used to scan or capture the image data of a document is regarded and will be referred to as a scanner. For example, the image data may be captured by a scanner in a copier, a facsimile machine, a multi-function device, a camera, a video camera, or any other known or later device that is capable of scanning a document and capturing electronic image data. In some embodiments, IIT or scanner 22 may be connected to a network or telephone system, for example, to receive as input image data such as via a facsimile (fax) machine or computer (CPU). Input documents and/or image data may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), Voice Over IP, WiFi network, or other networks or systems, or a combination of networks and/or systems, for example, and should not be limited to those mentioned above.

Figure 3:
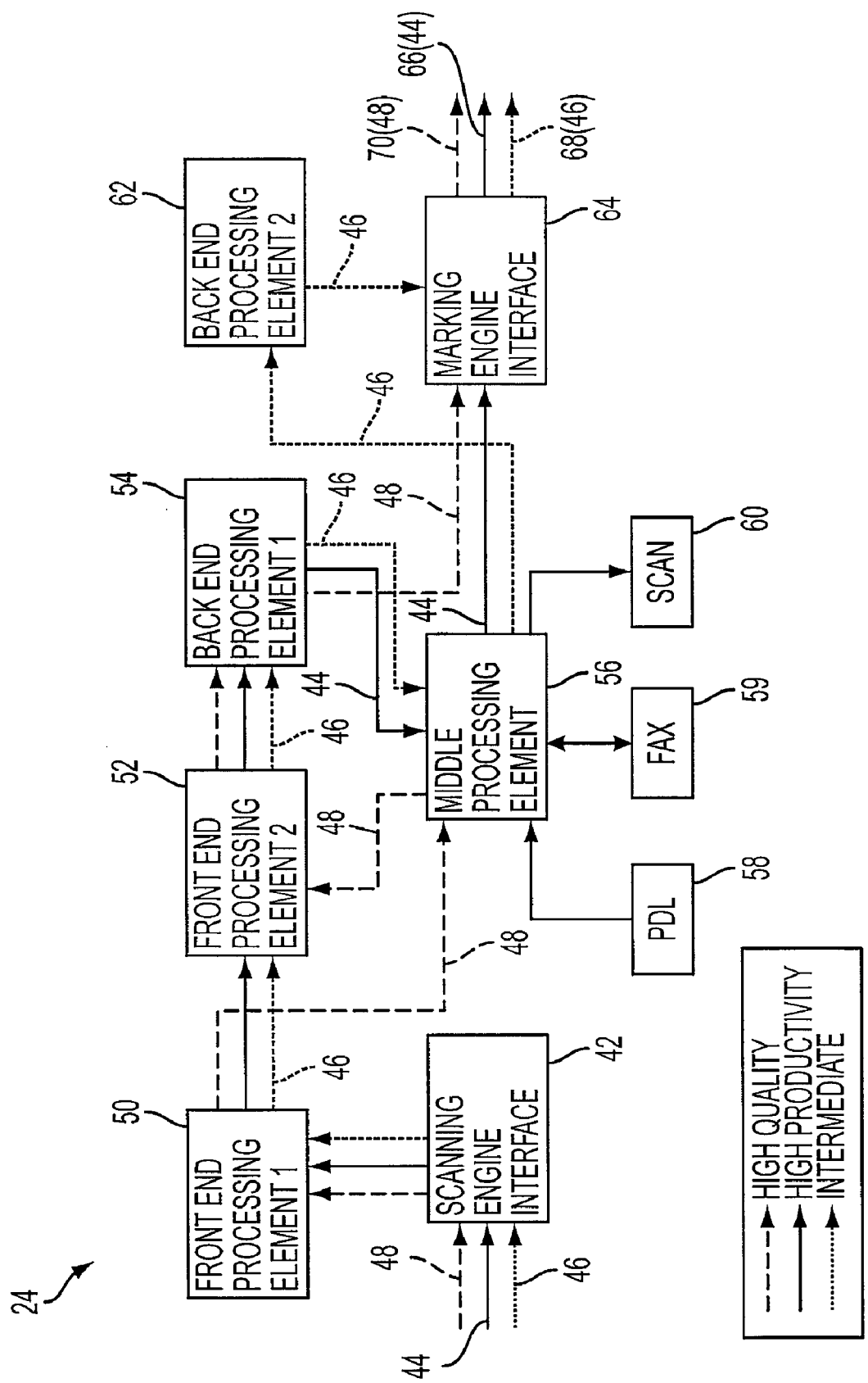
FIG. 3 illustrates a detailed view of the processing elements and image paths to be used in the image processing apparatus of FIG. 1.

The scanner 22 has a scanning engine interface 42 (shown in FIG. 3). The scanning engine interface 42 receives scanned image data from the scanner 22. The controller 16 communicates with the scanner 22 and/or scanning engine interface 42 to instruct the router 17 to direct or route the image data from the scanning engine interface 42 to the selectively chosen image path among the plurality of processing elements.

The IOT 26 or marking engine interface 64 (shown in FIG. 3) may be associated with a printer which is used for printing documents. The IOT 26 or marking engine interface 64 is used to output the processed image data to the printer.

The processing elements section 24 may comprise a plurality of image processing elements (further described below with reference to FIG. 3) for manipulating image data received from the scanner 22 using a plurality of operations and/or processes. The processing elements section may be a combination of image processing elements which comprise software and hardware elements that perform a number of operations on the image data received from the scanner 22 (or other source) using a set of parameters. The parameters are used to convert the images to the format desired as output (e.g., high quality) along an image path.

Each of the image processing elements in the processing elements section 24 comprises an input and an output. The image processing elements in section 24 have a plurality of image paths, and each image path corresponds to one of the plurality of output modes that may be selected for an image processing apparatus. When an output mode is selected, an image path among the plurality of image processing elements 24 between the 22 scanner and the printer 26 is chosen. The controller 16 and router 17 are used to select and route the image data between the processing elements 24.

As previously noted, a selection device 12 communicates with the controller 16 of the apparatus 10. The selection device 12 is associated with the image processing apparatus 10 and is provided for selecting one of a plurality of output modes.

In an embodiment, the selection device 12 may be pre-defined or set to a "default" mode. For example, an image processing apparatus 10 (e.g., MFP) may comprise a "default" output mode when performing operations such as copying or printing. In an embodiment, the selection device 12 may be configured based on the market for which the apparatus 10 will be used. For example, in a graphic arts environment the apparatus may be set at a high quality output mode. For example, in an office environment, the apparatus may be set at a high productivity output mode. In an embodiment, the apparatus 10 may be set to a default output mode by the manufacturer or distributor.

In an embodiment, the selection device 12 may be used to override the default setting of the apparatus. For example, the selection device 12 may be provided in the form of a user interface. The user interface may be provided on the apparatus such that a user may manually select the output mode for the printer. In an embodiment, the selection device may be provided on a user interface of a computer (such as a personal CPU) or other device. For example, a user may be able to select an output mode by sending instructions via a network.

The selections can be done through SW programming based on some configuration settings. These settings could be pre-determined, or based on user input. But we may not want to rule out the possibility of some automated way of determining the setting]

Figure 2:
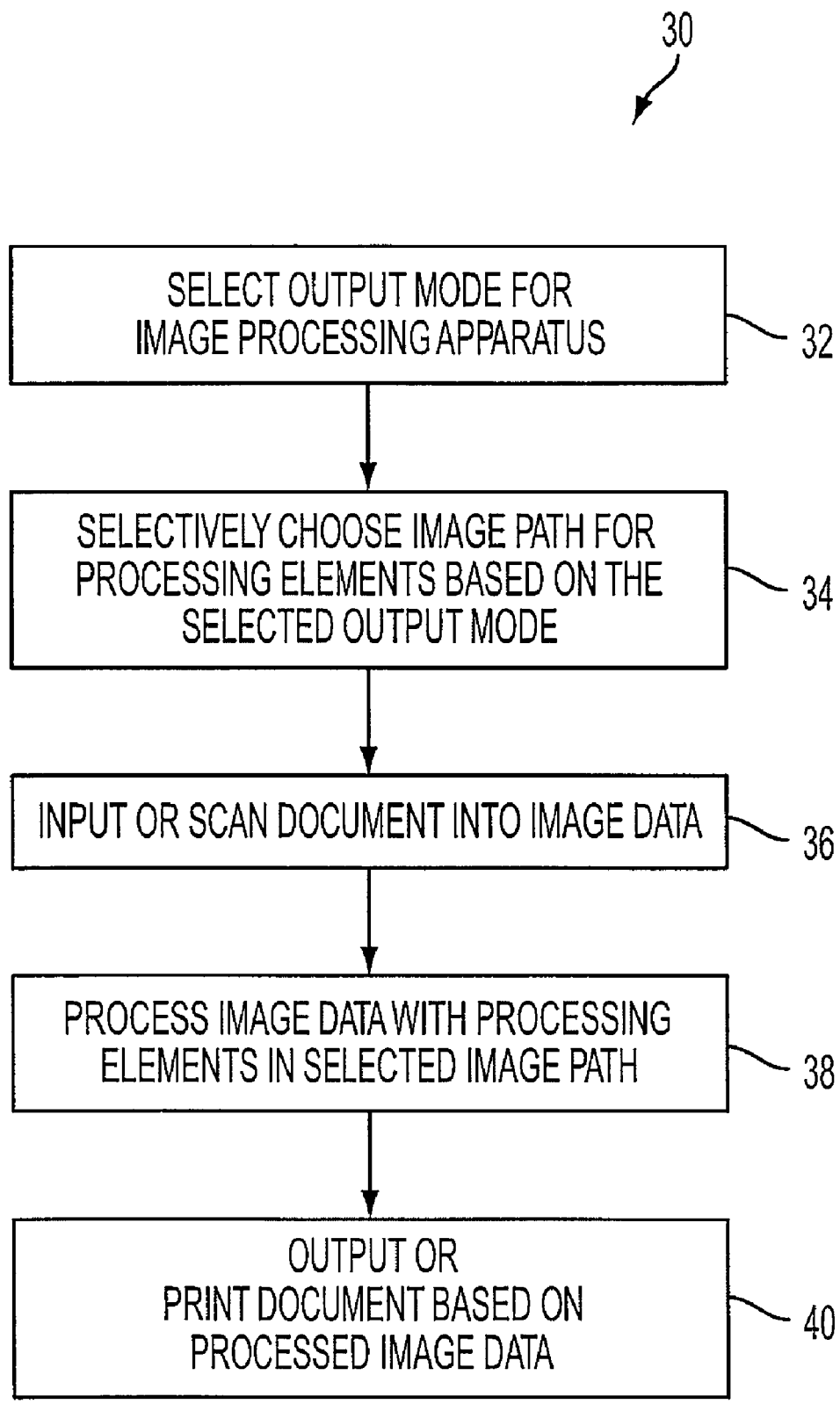
FIG. 2 illustrates a method for configuring an image path in accordance with an embodiment of the present disclosure.

FIG. 2 shows a method 30 for configuring an image path of an image processing apparatus, such as the apparatus 10 shown in FIG. 1. The image processing apparatus 10 includes a scanner 22 for scanning a document into image data and a printer 26 for printing documents. The method 30 comprises selecting 32 one of a plurality of output modes associated with the image processing apparatus. In an embodiment, the output mode may be selected using a selection device such as device 12, for example. In an embodiment, the output mode of the selection device may be pre-defined or set to a default output mode.

Based on the selected output mode, an image path is selectively chosen 34 among a plurality of processing elements between the scanner and the printer. The image path may be chosen using a controller such as controller 16, for example. Once an image path is chosen 34 among the processing elements based on the selected output mode, the document is scanned 36 into image data with the scanner. The image data is then processed 38 using the processing elements in the selected image path, and the document is then printed 40 based on the processed image data.

In an embodiment, a router such as router 17 is used to direct the image data to the input and output of the processing elements associated with the selected image path.

The output modes that may be selected may include a high productivity mode, a high quality output mode, and an intermediate output mode. The high productivity mode may include providing output data at an average image quality when copying and/or printing in order to increase productivity and/or volume of the output of documents, for example. As will be further described, the high productivity mode processes the image data in binary format such that less bandwidth is used for input, output, middle processing functions, and storage, and more bandwidth is provided during processing, thereby increasing an apparatus' productivity. More specifically, in the high productivity mode, less bandwidth is used for each scanned document or image. Therefore, more images may be processed within a certain period of time for a given total bandwidth of the apparatus 10.

The high quality output mode may include providing output data a higher quality output by using contone image data for input, output, middle processing, and storage. Though the high quality output mode may provide a slight loss in productivity due to the amount of data storage and bandwidth requirements required for processing and storing contone image data, the quality of the output image during copying or printing is increased.

The intermediate output mode may include providing output data with intermediate image or graphic quality and at a higher productivity. The intermediate output mode uses contone and binary image data during processing. By converting and storing the image data in binary format, less bandwidth and storage is required by the apparatus. Final processing steps may be performed after converting from binary image data to contone image data, however.

In an embodiment, the intermediate output mode may be used with existing devices such as MFPs to retrofit existing binary image paths with contone capabilities. For example, an existing MFP that is designed for a higher productivity output may be retrofit with an image processing element that will enable data to be converted into contone data and processed to produce a higher quality image for output.

The method and apparatus as herein described does not require more than one image processing element to be used at the same time. By reusing the image processing elements as described herein, cost-effective image paths for output are provided, as the amount of processing bandwidth in the image path that is processed and stored is based on a selected output mode.

FIG. 3 illustrates a detailed view of the image processing elements and image paths that may be used in the image processing apparatus 10 of FIG. 1. As noted above, the processing elements section 24 may comprise a plurality of image processing elements for manipulating image data received from the scanner 22 using a plurality of operations and/or processes. As shown in FIG. 3, the processing elements section 24 comprises a first front end processing element 50, a second front end processing element 52, a first back end processing element 54, a middle function processing element 56, and a second back end processing element 62. Generally, the front end processing elements are image processing elements that first receive image data in an image path and are used to process the image data according to user preferences such that it may be stored and later retrieved for output. Middle processing elements are generally used to compress image data for storage and decompress image data for output to a specific printing device. Back end processing elements are generally used at the end of an image path to retrieve stored image data and process the image data such that the image data may be output to a printing device as an accurate recreation of the original input or scanned image. Although the processing elements noted above are designed to perform specific functions, any number of processing elements may be used and should not be limiting.

FIG. 3 also shows scanning engine interface 42 and marking engine interface 64. Scanning engine interface 42 receives image data to be processed along an image path 44, 46, or 48, for example. The image paths 44, 46, and 48, as shown, are selectively chosen and correspond to one of the plurality of output modes, e.g., high productivity output mode 44, intermediate mode 46, and high quality output mode 48. Scanning engine interface 42 directs the images paths 44-48 to the first front end processing element 50.

First front end processing element 50 receives as input the image data from the scanner 22 via scanning engine interface 42 and processes the image data. First front end processing element 50 may be used to process the scanned image data as well as determine user-defined operations. For example, the first front end processing element 50 may be used for color space conversion, reduction or enlargement, neutral detection or segmentation, background detection, cropping, document registration, and/or performing other operations or processes on the image data, for example. Depending on the chosen image path (or output mode), the front end processing element 50 may send the processed image data to the second front end processing element 52 or the middle processing element 56.

Second front end processing element 52 may be used to further process the image data according to processing parameters and/or user-defined operations. For example, the second front end processing element 52 may be used to further process the image data such as filtering (to sharpen or soften) the image data, background suppression of the image data, adjust lightness and/or contrast, adjust hue and/or saturation, and/or other operations or processes. The input of image data to the second front end processing element 52 depends on the selectively chosen image path (or output mode). In an embodiment, the second front end processing element 52 may receive processed image data as input from the first front end processing cluster 50. In another embodiment, the second front end processing element 52 receives image data from the middle processing element 56.

First back end processing element 54 receives processed image data from the first 50 (not shown in FIG. 3) or second front end processing element 52. First back end processing element 54 may be used to further render the image data for output. For example, first back end processing element may be used to convert the color space of the processed image data (e.g., convert from device independent L*a*b color space to device dependent CMYK color space), provide color balance, further rendering, neutral replacement and/or other operations or processes. The output of processed image data from the first back end processing element 54 depends on the selectively chosen image path (or output mode). In an embodiment, the processed image data may be directly output to the marking engine interface 64 for printing using a printer. In another embodiment, the processed image data may be output to the middle processing element 56.

Middle processing element 56 may be used for temporarily storing image data. For example, the middle processing element 56 may be used to temporarily store scanned and/or printed images (or documents), e.g., received via scanner 22. The middle processing element 56 is also used for middle function operations (e.g., rotating, merging, annotating, etc.) and for compressing and/or decompressing image data for output, for example. The middle processing element 56 may communicate with memory 18 and/or storage 20 to store processed and/or compressed image data, for example. Compressed image data may be stored in memory 18 and/or storage 20 temporarily or for a later time when needed. When the image data is needed or it is time for marking (e.g., using the marking engine interface 64 or printing device), the image data may be retrieved from memory 18 and/or storage 20 via the middle processing element to export the image data that has been scanned 60, for example. Subsequently, the middle processing element 56 may be used to decompress the image data and output the image data to the next processing element based on the selected image path.

The input of image data to the middle processing element 56 depends on the selectively chosen image path (or output mode). In an embodiment, the middle processing element 56 may receive processed image data as input from the first front end processing element 50. In an embodiment, the middle processing element 56 receives image data from the first back end processing element 54.

In an embodiment, the middle processing element 56 extracts and/or receives and stores image data using page description language (PDL) 58. For example, when a print job is received from a network (e.g., via a print driver), for example, the original data in PDL format 58 may be rasterized and converted into intermediate image format and stored using middle processing element 56. Intermediate image format (IIF) may be defined as a storage format used with MFPs and similar devices. IIF minimizes the bandwidth requirement needed for performing concurrent operations on image data, as well as enables manipulation of the image data for middle function operations, such as those provided by middle processing element 56, or for processing required before marking the image, such as by IOT 26. Before marking the image data, the middle processing element 56 may retrieve and decompress the image data and output the image data to the appropriate processing element.

In another embodiment, the middle processing element 56 may be used to process and format image data for exporting out on a network. For example, in order to export images from an MFP, image data may need to be provided in an image format such as PDF, TIFF, JFIF, or JPEG file formats.

In an embodiment, the middle processing element 56 extracts and/or receives and stores image data via facsimile or fax 59. For example, when an incoming fax job is received from a network (e.g., via a driver), the image data may be decompressed and stored using middle processing element 56 until the fax is ready to be sent to a destination. Middle function operations (such as those listed above) may be applied to the decompressed image data before compression and/or storage. For an outgoing fax job, e.g., before marking the image data using marking engine interface 64, the middle processing element 56 may retrieve the image data from storage (e.g., memory 18 and/or storage 20), decompress the image data, and output the image data to the next processing element.

As noted above, the middle processing element 56 may be in communication with memory 18 and/or storage 20 for storing image data, for example. In an embodiment, image data that has been processed may also be copied and stored using the middle processing element 56.

The output of the image data from the middle processing element 56 also depends on the selectively chosen image path (or output mode). In an embodiment, the middle processing element 56 may output image data directly to an IOT or marking engine interface 64. The middle processing element 56 may be used to manipulate the pixels of the image data such that the image data format is compatible with the printer, for example.

In an embodiment, the middle processing element 56 may output image data to the second front end processing element 52. In an embodiment, the middle processing element 56 may output stored image data to the second back end processing element 62.

Second back end processing element 62 may be used to further process the image data such that it may be output to a printer. The second back end processing element 62 may perform similar operations or processes on the processed image data as described with reference to first back end processing element 54. For example, second back end processing element 62 may provide segmentation, color space conversion (e.g., binary to contone such as 1 or 4 bpp to 8 bpp or CMYK to K), resolution conversion (e.g. scaling (up or down)), filtering, and/or other operations or processes to the processed image data that is received from the middle processing element.

In an embodiment, the second back end processing element 62 may receive processed image data from the middle processing element 56. For example, image data may be transferred out of the middle processing element 56 and input into second back end processing element 62 when an intermediate output mode has been selected.

The second back end processing element 62 is advantageous because it increases the productivity by storing images in binary format in 56 and provides intermediate image quality for an output document. Also, as noted above, in an embodiment, the image quality of image paths of existing image processing apparatuses may also be improved by adding an additional back end processing element to the image path. The second back end processing element 62 may be added to an existing image path of an MFP. For example, if an existing MFP processes binary image data has a second back end processing element added thereto (such that is will convert the binary image data into contone image data for final processing and printing), the image quality of the output image and/or document will increase.

The image output terminal (IOT) 26 or marking engine interface 64 is designed to receive the reconstructed and processed image data in order to send or output the image data to the printer for a copy or print job. The IOT 26 or marking engine interface 64 may further perform image processing on the image data to make corrections or compensate for deviation in the printing process. Alternatively, the second back end processing element 62 may be used to perform further image processing on the image data.

The marking engine interface 64 outputs processed image data to the printer to complete the image path 66, 68, or 70, for example. The image paths 66, 68, and 70, as shown, are correspond to the input image paths 44, 46, or 48 for one of the plurality of output modes, e.g., high productivity output mode 44, intermediate mode 46, and high quality output mode 48. Thus, the input of processed image data to the marking engine interface 64 depends on the selectively chosen image path (or output mode). In an embodiment, the marking engine interface 64 receives image data from the first back end processing element 54. In an embodiment, the interface 64 receives image data from the middle processing element 56. In an embodiment, the marking engine interface 64 receives image data as input from the second back end processing element 62. Marking engine interface 64 then directs the output along image paths 66-68 to the printer for printing a document.

Figure 4:
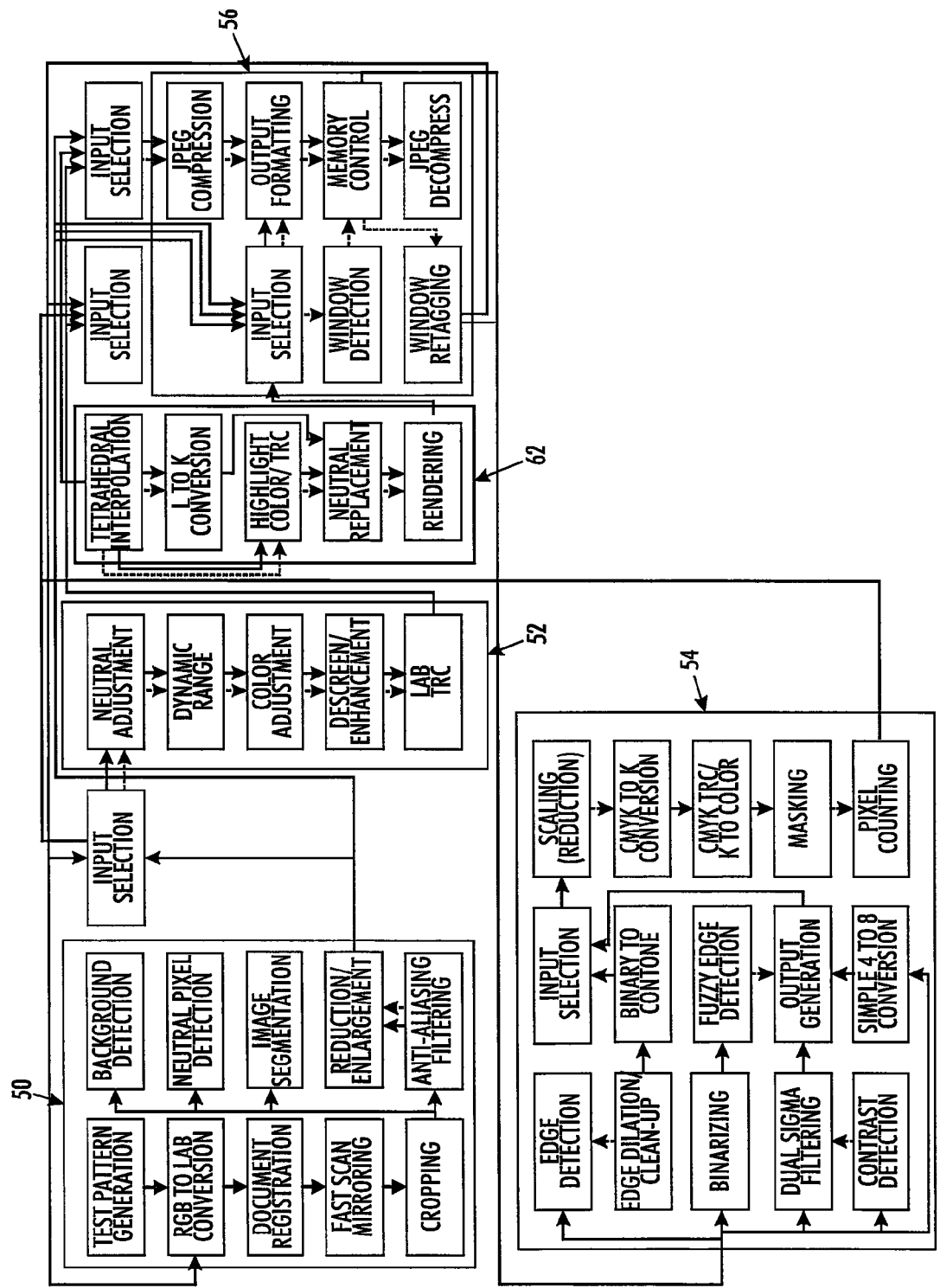
FIG. 4 illustrates a detailed view of the processes and paths for the processing elements of FIG. 3.

FIG. 4 illustrates a detailed view of the processes and paths for the processing elements of FIG. 3. More specifically, examples of the image processing operations performed by the first front end processing element 50, second front end processing element 52, first back end processing element 54, middle processing element 56, and second back end processing element 62 and the image paths for input image data is shown. In some embodiments, first front end processing element 50 may receive input image data and perform image processing operations such as, but not limited to, test pattern generation, color conversion (e.g., converting from dependent color space RGB to independent color space L*a*b), document registration, fast scan mirroring, cropping, background detection, neutral pixel detection, image segmentation, anti-aliasing filtering and/or reduction/enlargement of the image data. In some embodiments, second front end processing element 52 may receive image data and perform image processing operations such as, but not limited to, neutral adjustment, dynamic range, color adjustment, descreening/enhancement, and/or tonal reproduction curves (TRC) on the image data.

In some embodiments, first back end processing element 54 may perform image processing operations on image data that is input thereto such as, but not limited to, binarizing, edge detection, fuzzy edge detection, contrast detection, dual sigma filtering, edge dilation/clean-up, binary to contone conversion, simple 4 bpp to 8 pp conversion, input selection, output generation, scaling (e.g., reduction), color space conversion (e.g., CMYK to K conversion or CMYK TRC/K to color conversion), masking, and/or pixel counting. Input selection may be, for example, a method of routing data such as by using a multiplexer or MUX. The output generation block designates outputting the image data selected from multiple inputs based on a received control signal, for example. Such a control signal may be received or defined base on the selected mode or image path configuration.

In some embodiments, second back end processing element 62 may receive image data and perform image processing operations such as, but not limited to, tetrahedral interpolation, L to K conversion, highlighting, neutral replacement, rendering, input selection, window detection, window retagging, image compression (e.g., into JPEG format), output formatting (e.g., for the selected output device (printer, fax, network, etc.)), memory control, and/or image decompression on the image data.

As noted above, although the operations are provided above in relation to specific processing elements, the image processing operations listed above should be limited to those described. For example, additional operations for processing such as tagging, mapping, and like may also be performed by one or more of the processing elements.

Figure 5:
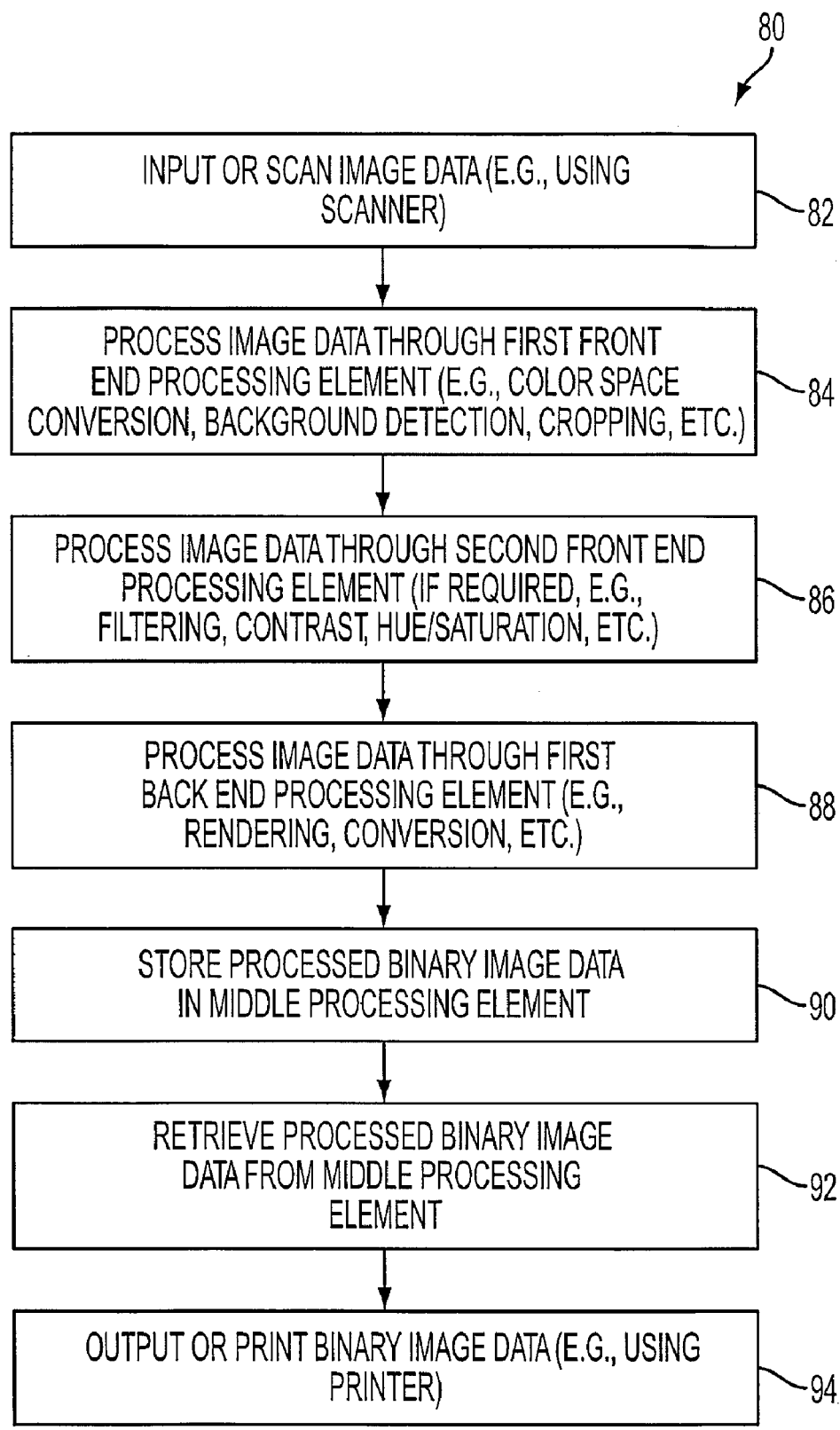
FIG. 5 illustrates an example of processing image data in an image path for a high productivity output using binary image data in accordance with an embodiment of the present disclosure.
Figure 6:
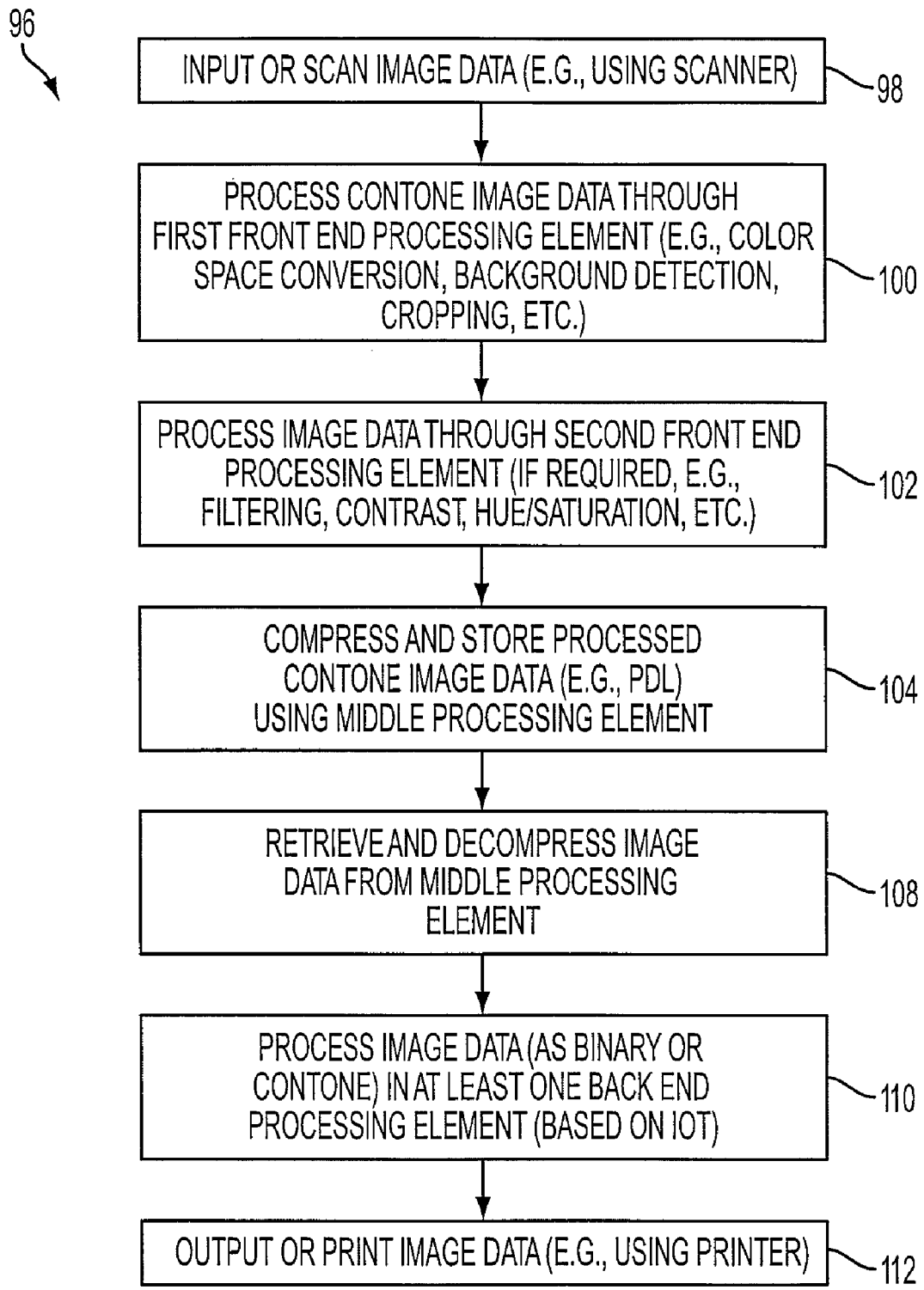
FIG. 6 illustrates an example of processing image data in an image path for a high quality output using contone image data in accordance with an embodiment of the present disclosure.
Figure 7:
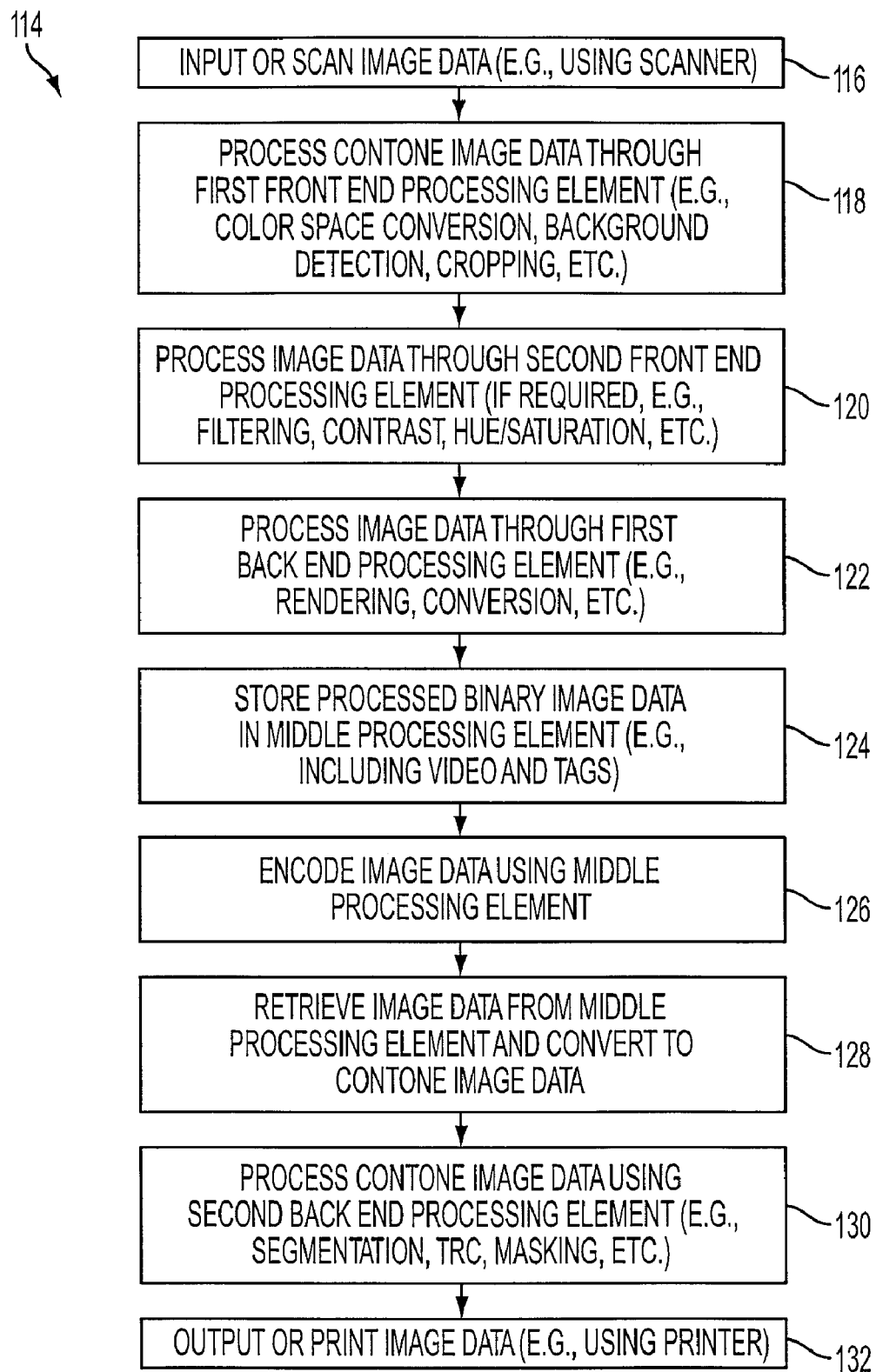
FIG. 7 illustrates an example of processing image data in an image path for a intermediate productivity and intermediate quality output using contone and binary image data in accordance with an embodiment of the present disclosure.

Thus, as noted above, the image processing apparatus may comprise at least three different output modes wherein an image path may be configured and/or reconfigured based on a user's or market's selection for output for a copy and/or print job(s). FIGS. 5-7 illustrate methods of using the above-described processing elements of FIG. 3, for example, to configure an image path based on the selected output mode.

FIG. 5 illustrates an example of a method 80 for processing image data in an image path for a high productivity output using binary image data. The method 80 may be used for copying and printing binary image data so as to produce printed documents at a high productivity or volume. More specifically, processing binary image data requires less bandwidth for input, output, middle processing functions, and storage. Thus, more data bandwidth is available during processing, thereby increasing an apparatus' productivity.

Image data is first input or scanned 82 using an IIT or scanner and sent (e.g., using scanning engine interface) to the first front end processing element 50. Image data may be scanned as contone image data, for example. The image data is then processed 84 using the first front end processing element 50 and processed 86 using the second front end processing element 52. For example, the first end processing elements 50 or 52 may process the image data from contone to binary image data, for example. The image data is then processed 88 using the first back end processing element 54 and stored 90 using the middle processing element 56. For example, the first back end processing element 54 may process the binary image data such that is ready for output to a printer. The binary image data may then be stored using the middle processing element 56 to memory 18 and/or storage 20, for example. At the time of marking the image data (i.e., for printing), the image data is retrieved 92 (e.g., from memory 18 and/or storage 20) from the middle processing element 56 and the images are sent directly to the IOT 26 and/or marking engine interface 64 to be printed 94.

FIG. 6 illustrates an example of a method 96 for processing image data in an image path for a high quality output using contone image data. The method 96 for high quality output generally may provide a loss in productivity due to the amount of data storage and bandwidth requirements required for processing and storing contone image data.

Image data is scanned 98 using a scanner 22. Image data may be scanned as contone image data, for example. The image data is processed 100 using the first front end processing element 50 and processed 102 using the second front end processing element 52. The processed contone image data is then compressed and stored 104 using the middle processing element 56. Additionally, contone PDL image data is also stored 104 in the same format using the middle processing element 56. By storing PDL image data in contone format as well, different job types may be mixed and matched at the time of marking. In other words, copy and print jobs can be easily combined as a single job. Thus, similar back end processing can be applied to the image data when retrieved for marking and output. Also, by sending the image data through the same back end processing modules, the image quality output from copy and print processing may output a similar-looking product or document.

At the time of marking, image data is retrieved and decompressed 108 using the middle processing element 56. The image data is then processed 110 using at least one of the back end processing elements, and then the image data is sent to the marking engine interface 64 to print 112 the image data using a printer. The image data may be sent to either first or second back end processing elements 54 and/or 62. Also, depending on the IOT or marking engine interface requirement for printing the image data, either contone or binary image may be provided to the first or second back end processing elements for further processing.

FIG. 7 illustrates an example of a method 114 for processing image data in an image path for intermediate output. More specifically, the method 114 provides an output mode of a high productivity and intermediate quality and uses contone and binary image data during processing.

Image data is scanned 116 using a scanner 22. Image data may be scanned as contone image data, for example. The image data is processed 118 using the first front end processing element 50 and processed 120 using the second front end processing element 52. The image data is then processed 122 using the first back end processing element 54. The image data is converted (e.g., using first back end processing element 54) from processed contone image data to binary image data, and stored 124 using the middle processing element 56. Thus, less bandwidth and storage is required by the apparatus.

At the time of marking the image data (i.e., for printing), the image data is retrieved 128 (e.g., from memory 18 and/or storage 20) via the middle processing element 56. The data is then converted 128 from binary image data to contone image data for further processing. The contone image data is then processed 130 using the second back end processing element 62, and then sent to the IOT 22 and/or marking engine interface 64 to be processed and printed 132. The end processing of the image data in contone format thus provides a higher quality output.

In an embodiment, when an intermediate mode is selected as the output mode, the method and apparatus manipulate and process the image data using a Binary Data Extended to Contone (BDEC) technology. BDEC technology is further described in U.S. Pat. No. 6,343,159, issued Jan. 29, 2002, and U.S. Patent Application Publication Nos. 2006/0257045 A1, Ser. No. 11/126,970, filed May 11, 2005; 2007/0103731 A1, Ser. No. 11/268,147, filed Nov. 7, 2005; 2007/0109602 A1, Ser. No. 11/281,267, filed Nov. 17, 2005; 2007/0258101 A1, Ser. No. 11/272,182, filed Nov. 10, 2005; and 2007/0253631 A1, Ser. No. 11/413,203, filed Apr. 28, 2006, which are herein incorporated by reference. In BDEC technology methods, stored binary image data (1 bit) is converted to contone image data or undergoes a binary halftoning process, and is further processed for output. One advantage of using BDEC technology is that it uses less memory than copying and/or printing when using contone image data (with 8 bits). It may also require the rendering of tags, for example, and other image processing operations to convert the image data to halftone or contone for processing.

Although the above description is described as being used with processing elements of a multifunction product device (MFP), the method may also be applied to alternative image processing apparatuses such as photocopying or copying machines, a facsimile device, xerographic, and/or other devices with printing and/or scanning capabilities.

Additionally, although a document is scanned into image data, the source of the image data may be any one of a number of different sources, such as a digital copier, a facsimile device, or other device suitable for generating electronic image data.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features and advantages of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method for configuring an image path of an image processing apparatus, the image processing apparatus including an image input terminal for inputting documents into image data and an image output terminal for outputting documents for a specific type of output device, the image processing apparatus comprising a plurality of image processing elements configured to process and output image data, the method comprising:
    selecting one of a plurality of output modes for the specific type of output device using a selection device associated with the image processing apparatus;
    based on the selected output mode, selectively choosing an image path among a plurality of image processing elements between the image input terminal and the image output terminal using a controller, each of the plurality of image processing elements comprising an input and output, and wherein each of a plurality of image paths is a series of routing connections between the inputs and outputs of the image processing elements, each image path among the plurality of processing elements corresponding to one of the plurality of output modes for the specific type of output device;
    inputting a document with the image input terminal into image data;
    processing the image data of the document with the image processing elements in the selected image path, and
    outputting a document from the specific type of output device using the image output terminal based on the processed image data.

2. A method according to claim 1, wherein the image input terminal is a scanner for scanning documents into image data.

3. A method according to claim 1, wherein the specific type of output device is a printer for printing documents.

4. A method according to claim 1, further comprising selectively routing the image data to the input and output of the image processing elements associated with the selected image path using a router.

5. A method according to claim 1, wherein the plurality of output modes for the specific type of output device comprise at least a higher productivity output mode, a higher quality output mode, and an intermediate output mode.

6. A method according to claim 1, wherein the selection of the output mode is predefined.

7. A configurable image processing apparatus comprising:
    a scanner for scanning a document into image data;
    a printer for printing a document;
    a selection device for selecting one of a plurality of output modes for the printer of the image processing apparatus;
    a plurality of image processing elements for processing the image data according to the selected output mode for the printer, each of the image processing elements comprising an input and an output;
    a router configured to route the image data among the image processing elements via an image path selected from a plurality of image paths, each image path being a series of routing connections between the inputs and outputs of the processing elements; and
    wherein the router is configured to select the image path among the plurality of image processing elements based upon the selected output mode, and wherein each of a plurality of image paths is a series of routing connections between the inputs and outputs of the image processing elements and each image path among the plurality of processing elements corresponds to one of the plurality of output modes for the printer.

8. An apparatus according to claim 7, wherein the plurality of output modes for the printer comprise a higher quality output mode, a higher productivity output mode, and an intermediate output mode.

9. An apparatus according to claim 7, wherein the output mode is predefined.

10. An apparatus according to claim 9, wherein the output mode is reconfigured for a document using the selection device.

11. An apparatus according to claim 7, wherein the selection device is provided on a user interface.

12. A non-transitory computer readable medium having stored computer executable instructions, wherein the computer executable instructions, when executed by a computer, directs a computer to perform a method for configuring an image path of an image processing apparatus configured to output image data using a specific type of output device, the method comprising:

selecting one of a plurality of output modes for the specific type of output device using a selection device associated with the image processing apparatus;

based on the selected output mode, selectively selecting an image path among a plurality of image processing elements between an image input terminal and an image output terminal using a controller, each of the plurality of image processing elements comprising an input and output, and wherein each of a plurality of image paths is a series of routing connections between the inputs and outputs of the processing elements, each image path among the plurality of processing elements corresponding to one of the plurality of output modes for the specific type of output device;

selectively routing the image data to the input and output of the processing elements associated with the selected image path using a router;

inputting a document with the image input terminal into image data;

processing the image data of the document with the image processing elements in the selected image path, and outputting a document from the specific type of output device based on the processed image data.

13. The non-transitory computer readable medium according to claim 12, the method further comprising selectively routing the image data to the input and output of the image processing elements associated with the selected image path using a router.

14. The non-transitory computer readable medium according to claim 12, wherein the plurality of output modes for the specific type of output device comprise at least a higher productivity output mode, a higher quality output mode, and an intermediate output mode.

15. The non-transitory computer readable medium according to claim 12, wherein the selection of the output mode is predefined.

* * * * *